(12) United States Patent
Medina et al.

(10) Patent No.: US 6,557,800 B2
(45) Date of Patent: May 6, 2003

(54) CARGO HANDLING SYSTEM FOR AIRCRAFT COMPARTMENTS

(75) Inventors: Miguel A. Medina, Canoga Park, CA (US); Alonzo Royal, Torrance, CA (US); Rosario Saggio, Arcadia, CA (US); William N. Korb, Orange, CA (US); Behrooz Afghani, Huntington Beach, CA (US); Karlton K. Okamoto, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/964,020

(22) Filed: Sep. 26, 2001

(65) Prior Publication Data

US 2003/0057326 A1 Mar. 27, 2003

(51) Int. Cl.⁷ .................................................. B64C 1/20
(52) U.S. Cl. ................................... 244/118.1; 193/35 R
(58) Field of Search ........................... 244/118.1, 137.1; 193/35 R, 37; 198/782

(56) References Cited

U.S. PATENT DOCUMENTS

| 3,463,334 A | * | 8/1969 | Blakely et al. ........... 244/137.1 |
| 3,741,504 A | * | 6/1973 | Alberti et al. ............ 244/137.1 |
| 4,000,870 A | * | 1/1977 | Davies ................. 244/137.1 X |
| 4,807,735 A | | 2/1989 | Huber ................. 244/137.1 X |
| 4,832,185 A | | 5/1989 | Huber ................. 244/137.1 X |
| 5,097,565 A | | 3/1992 | Shorey |
| 5,101,962 A | | 4/1992 | Pritchard ..................... 198/782 |

OTHER PUBLICATIONS

"BCT Cargo Systems. The Prospects for Future Air Cargo Handling".

* cited by examiner

Primary Examiner—Robert P. Swiatek
(74) Attorney, Agent, or Firm—Harness Dickey & Pierce P.L.C.

(57) ABSTRACT

A cargo handling system for cargo compartments utilizes a cargo container which rides along restraining guide rails and on top of rollers situated within and projecting slightly above structural members which are attached to roller possessing cross tracks. The cargo handling system utilizes an omni directional panel just inside the cargo door to facilitate loading, unloading, and rotational alignment of the cargo containers with the guide rails and rollers. Cargo locks situated within the roller channels and the omni directional panel secure the cargo containers in a longitudinal direction of the aircraft fuselage while a side latch within the omni directional panel secures cargo containers vertically, and in a lateral direction. An automatic anti-rollout restraint prevents the cargo container from rolling out of the aircraft while the cargo containers are being loaded or unloaded. Optionally, a power drive unit automatically moves the cargo containers along the rollers.

20 Claims, 14 Drawing Sheets

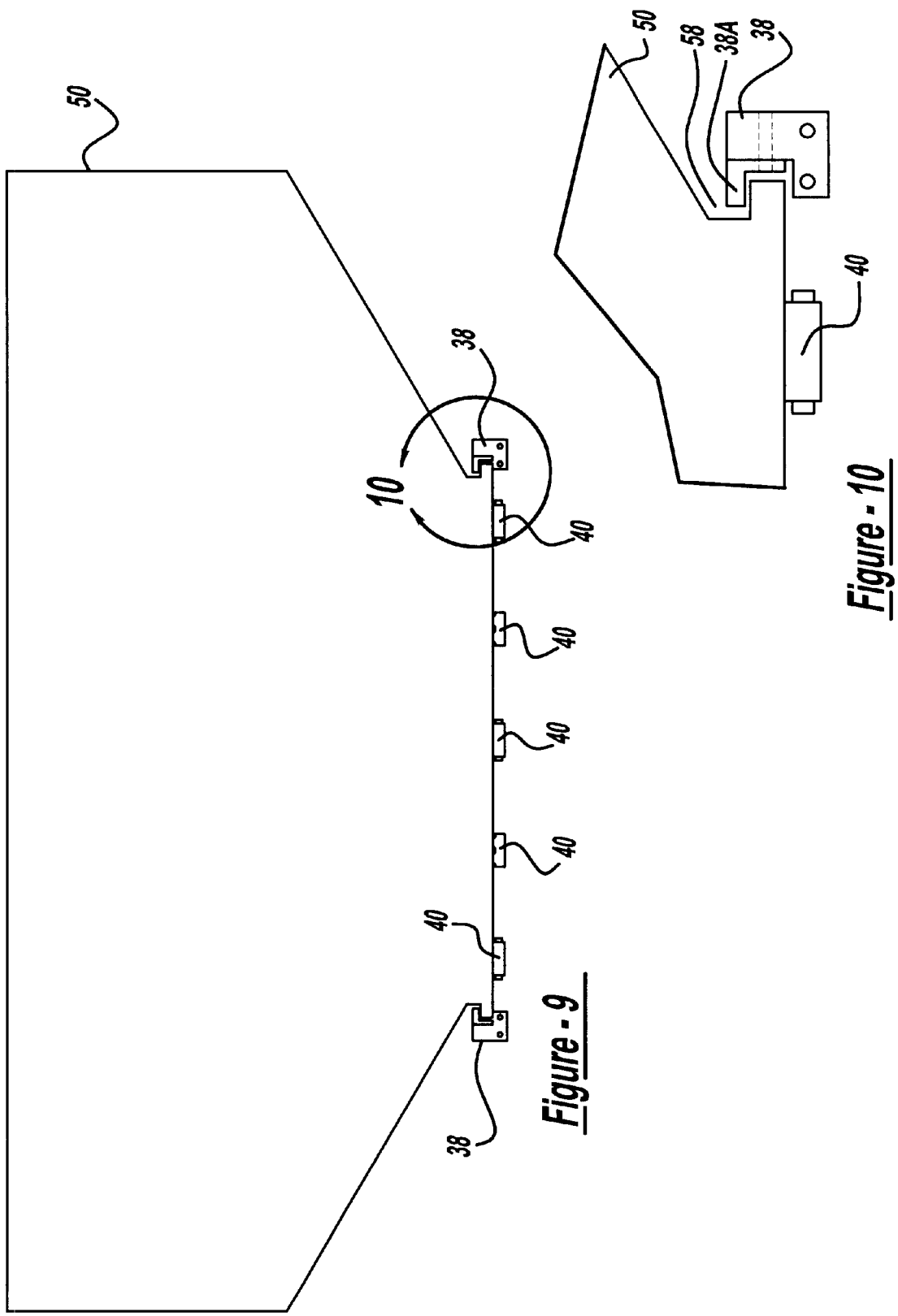

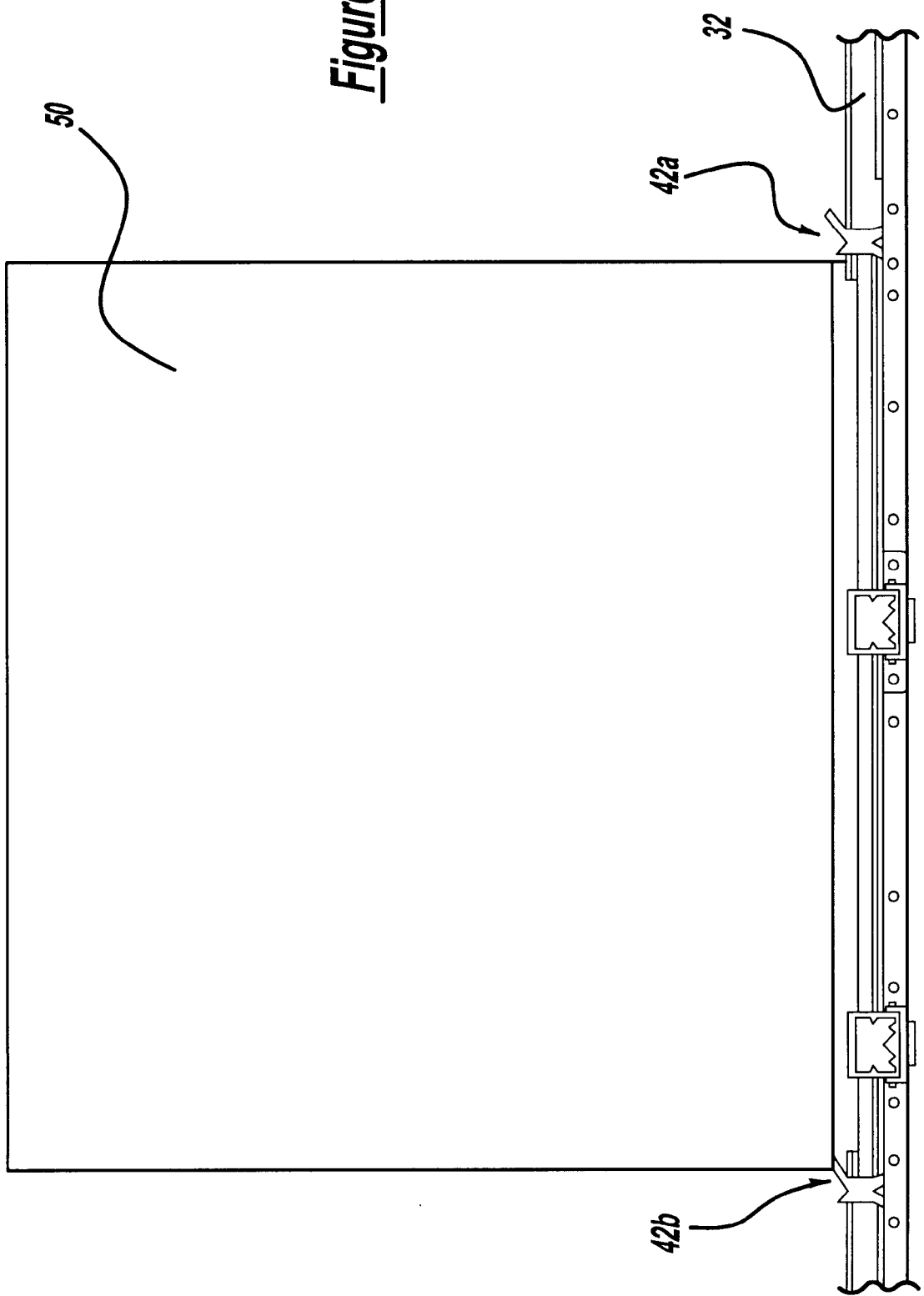

CARGO HANDLING SYSTEM FOR AIRCRAFT COMPARTMENTS

FIELD OF THE INVENTION

The present invention relates to a containerized cargo handling system and, more particularly, to a containerized cargo handling system for aircraft cargo compartments.

BACKGROUND OF THE INVENTION

Cargo handling systems (CHS) are typically used in a variety of applications to move or situate cargo in a particular area whether the system moves cargo on the ground or within one of many different vehicles such as a ship, truck, or aircraft. While current aircraft cargo handling systems or methods have generally proven to be satisfactory for their applications, each is associated with its share of limitations.

One such limitation pertaining to cargo loading and associated cargo packing within aircraft cargo compartments is the extraordinary amount of manual labor necessary to efficiently load an airplane cargo compartment. Due to a variety of cargo package sizes, maximizing the cargo compartment volume proves to be particularly tedious. The problem of efficiently utilizing the volume of aircraft cargo compartments has been addressed by utilizing manual labor to enter the cargo compartment to situate and precisely pack the cargo compartment to ensure that cargo compartment volume is efficiently utilized.

Another problem associated with aircraft CHS relates to securing the cargo in its stowed position. Securing cargo within an aircraft cargo compartment is important since cargo shifting occurs during aircraft takeoffs and landings, mid-flight ascents and descents and during a multitude of random in-flight air-turbulent events. The problem of securing the multitude of different cargo package sizes within cargo compartments is presently solved by securing cargo packages with tie-down cords or nets that are attached to the interior of the aircraft fuselage. These cords and nets are typically placed on each individual package or by securing zones throughout the cargo compartment. Despite this security measure, cargo shifting results since the cargo boxes, many of them being standard cardboard, abut each other, and a shift in one cargo box usually results in a shift of an adjacent box. This horizontal and vertical shifting causes cargo loads to become unsecured, potentially resulting in cargo damage.

Prior art solutions to the above problems encompass the implementation of a conveyor system built into the floor of a particular aircraft cargo compartment. This conveyor system is typically referred to within the airline cargo industry as a "magic carpet". While the magic carpet may move cargo packages across an aircraft cargo compartment floor more quickly, manual labor must still be used to situate the cargo within the cargo compartment. Additionally, the system is inflexible because it is fixed within the cargo compartment floor and cannot be removed or altered without drastic changes to the aircraft floor. Additionally, while the task of loading an aircraft cargo compartment is accomplished from an aircraft cargo door with the magic carpet moving the packages along the cargo compartment floor, cargo personnel are still necessary to cure cargo jams and to reorient packages that become lodged on the conveyor or loaded inefficiently. Additionally, the magic carpet does not alleviate the problem of making efficient use of a cargo compartment from the cargo floor to the cargo ceiling. This task is still accomplished with manual labor. Furthermore, the magic carpet is not cost effective because the system is built into the floor of the aircraft cargo compartment and presents not only a high installation or purchase cost, but also high maintenance costs since the system employs a multitude of moving parts consisting of electrically actuated motors or hydraulic systems, many of which are located under the cargo compartment floor.

Still yet another problem associated with cargo loading systems is that all loading typically takes place piece by piece at an aircraft cargo door. This presents several problems. First, cargo loading must be done in inclimate weather causing airline personnel to brave the elements for particularly long periods of time depending upon the number of packages to be loaded. Second, the cargo may also be subjected to the elements potentially causing cargo damage. Whether or not the particular aircraft is equipped with a magic carpet, the packages must still be placed individually into the aircraft.

Accordingly, there is a need for a cargo handling system that does not suffer from the above limitations.

SUMMARY OF THE INVENTION

In accordance with the teachings of the present invention, a cargo handling system (CHS) for aircraft cargo compartments is disclosed. The system provides a plurality of structural or roller channels that contain a plurality of rollers on which a cargo container travels. The system also provides a plurality of roller-containing cross channels, transversely situated on the cargo compartment floor, to connect and provide rigidity to the structural channels and secure the CHS to an underlying aircraft support structure. Additionally, the CHS provides an omni directional panel connected to the structural channels and situated at a cargo compartment door. Furthermore, the CHS provides a cargo container with a lower, side recession to interact with guide rails attached to the CHS and prevent the cargo container from shifting side to side (transverse to the roller direction) and vertically within the cargo compartment. Also restricting movement and part of the CHS are a series of cargo locks that hold each cargo container in place with respect to aircraft forward and aft directions, a side latch to secure the cargo containers near the cargo compartment door, and an anti-rollout restraint to prevent the cargo containers from rolling outboard of the aircraft upon loading and unloading. Finally, the CHS contains an optional power drive unit (PDU) to assist in moving the cargo containers deeper into and out of the cargo compartment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a front view of the cargo container of FIG. 8 illustrating how the cargo container rides on the rollers and interacts with the guide rails of the present invention;

FIG. 10 is an enlarged view of the encircled area 10 of FIG. 9;

FIG. 11 is a side view of a cargo container of FIG. 8 illustrating how the cargo locks engage to secure a cargo container;

DETAILED DESCRIPTION OF THE PREFERRED EMBODIMENTS

The following description of the preferred embodiment(s) is merely exemplary in nature and is in no way intended to limit the invention, its application, or uses.

Figure 1:
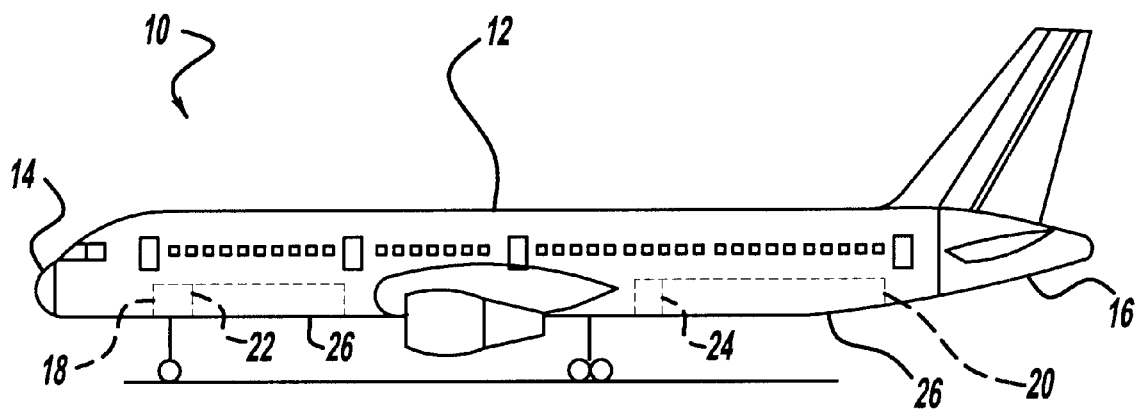
FIG. 1 is a side view of a passenger or freighter aircraft with the locations of exemplary cargo compartments shown in phantom.

FIG. 1 shows a representative commercial passenger or freighter aircraft 10 with a fuselage 12, aircraft forward portion 14, and aircraft aft portion 16. Additionally, the locations of forward cargo compartment 18, and aft cargo compartment 20 with cargo doors 22 and 24, respectively, each house a cargo handling system (CHS) 26 (FIG. 2) of the present invention. Aft cargo compartment 20 will be used as the representative cargo compartment for the basis of this detailed discussion, although those skilled in the art will recognize that nearly any available area of the aircraft 10 may serve as a cargo compartment and possess the potential of accepting a CHS 26 according to the principles of the present invention.

Figure 2:
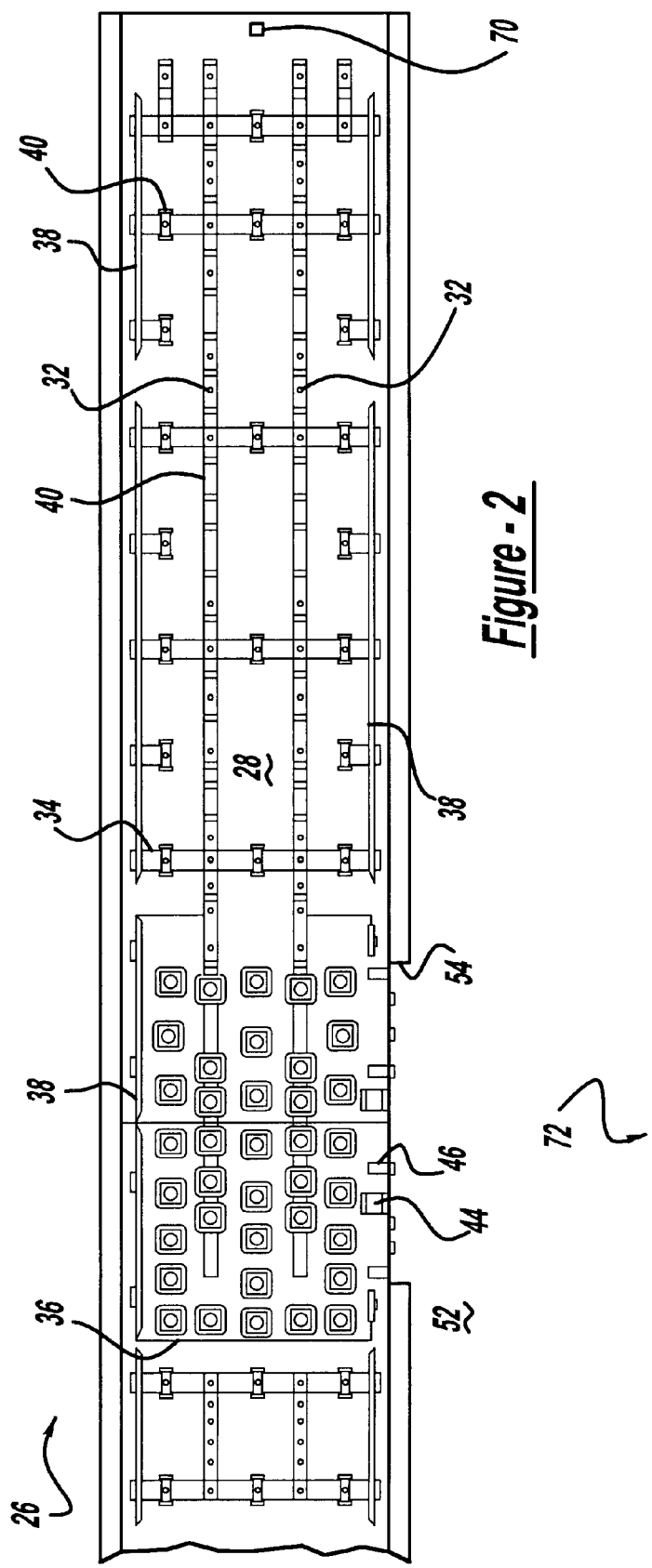
FIG. 2 is a plan view of a cargo handling system according to the principles of the present invention.
Figure 3:
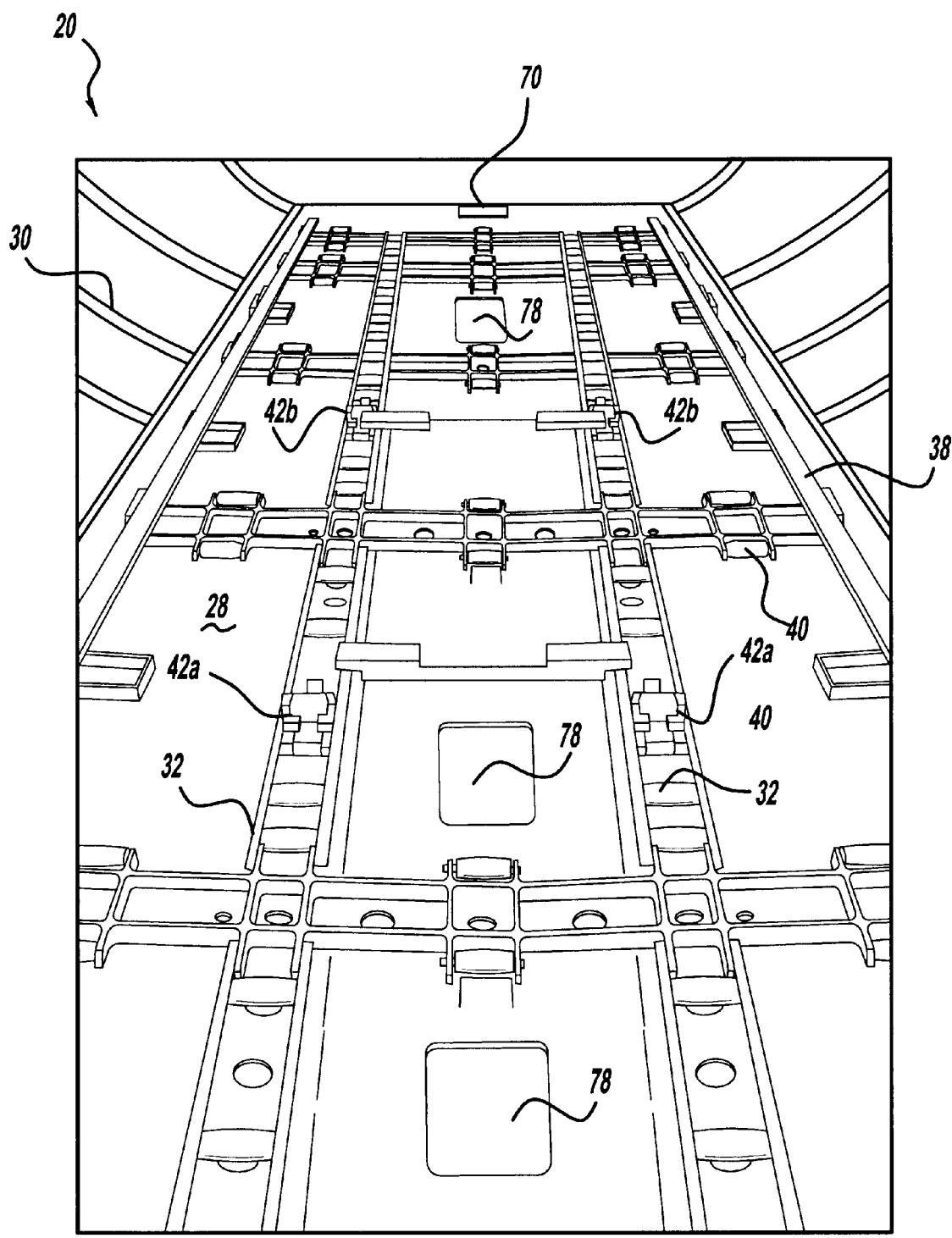
FIG. 3 is a perspective view of a cargo compartment containing a cargo handling system according to the principles of the present invention.
Figure 4:
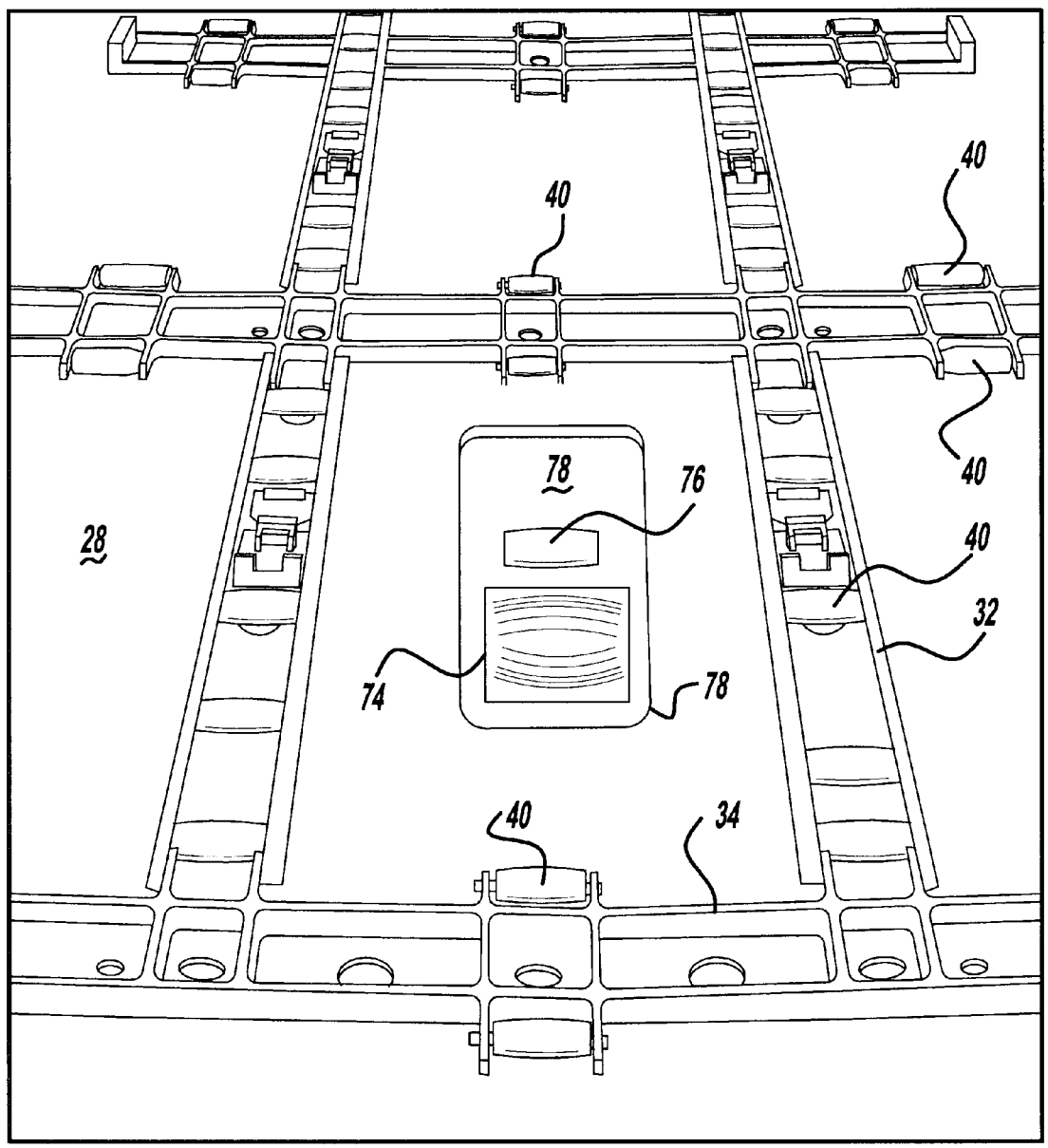
FIG. 4 is an enlarged perspective view of a cargo compartment showing an optional power drive unit according to the principles of the present invention.
Figure 5:
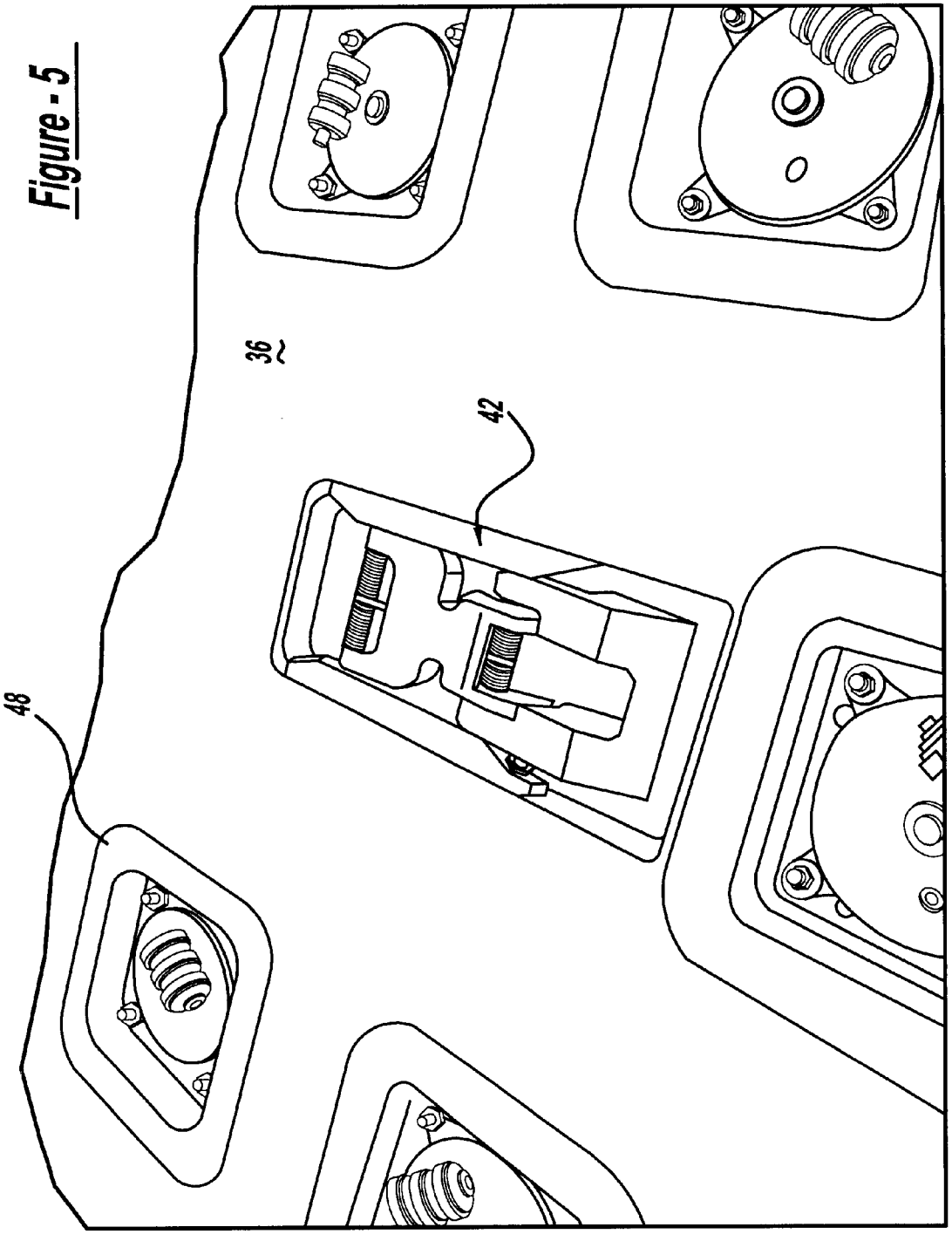
FIG. 5. is an enlarged perspective view of an omni directional panel showing an omnidirectional roller and a cargo lock according to the principles of the present invention.
Figure 6:
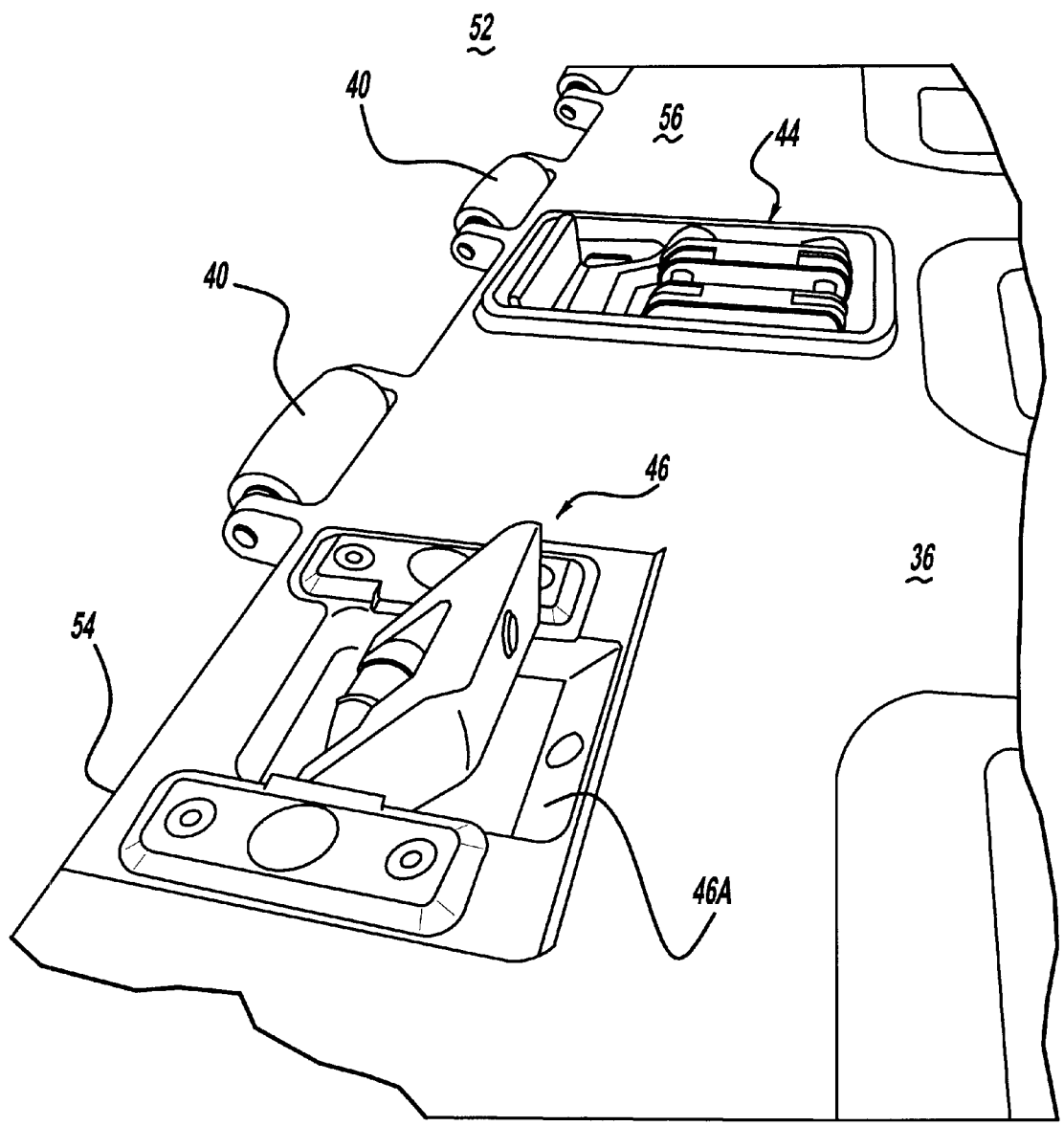
FIG. 6 is a perspective view of an omni directional panel showing a side latch, rollers, and an anti-rollout restraint according to the principles of the present invention.

Generally, the aft cargo compartment 20 possesses a CHS 26 as shown in FIGS. 2–4. With continued reference to FIGS. 2–4, the CHS 26 of the present invention mounts to a cargo compartment floor 28 which is supported by an aircraft substructure 30 (FIG. 3). The CHS 26 includes a plurality of structural channels 32, also referred to as roller channels, generally in the form of a C-channel. A plurality of cross channels 34, extend perpendicular to channels 32. An omni directional panel 36 is provided in communication with the structural channels 32. Guide rails 38 extend along opposite sides of the cargo compartment floor 28. A plurality of rollers 40 are disposed on the cross channels 34 and structural channels 32. A plurality of cargo locks 42 are disposed on the structural channels 32. In greater detail to better depict their position and operation, FIG. 5 shows a cargo lock 42 positioned in an omni directional panel 36, along with a plurality of caster rollers 48, also shown in the enlarged view of FIG. 7. Continuing, FIG. 6 shows an omni directional panel 36 including a side latch 44, an anti-rollout restraint 46, and rollers 40. Additionally, the CHS 26 comprises at least one cargo container 50 shown in the perspective view of FIG. 8, and also in FIGS. 9, 10, and 11. Cargo container 50 translates upon the rollers 40 of CHS 26 and caster rollers 48 of the omni directional panel 36. The caster roller 48 is further depicted in co-pending U.S. patent application Ser. No. 09/908,159, filed on Jul. 18, 2001.

Figure 8:
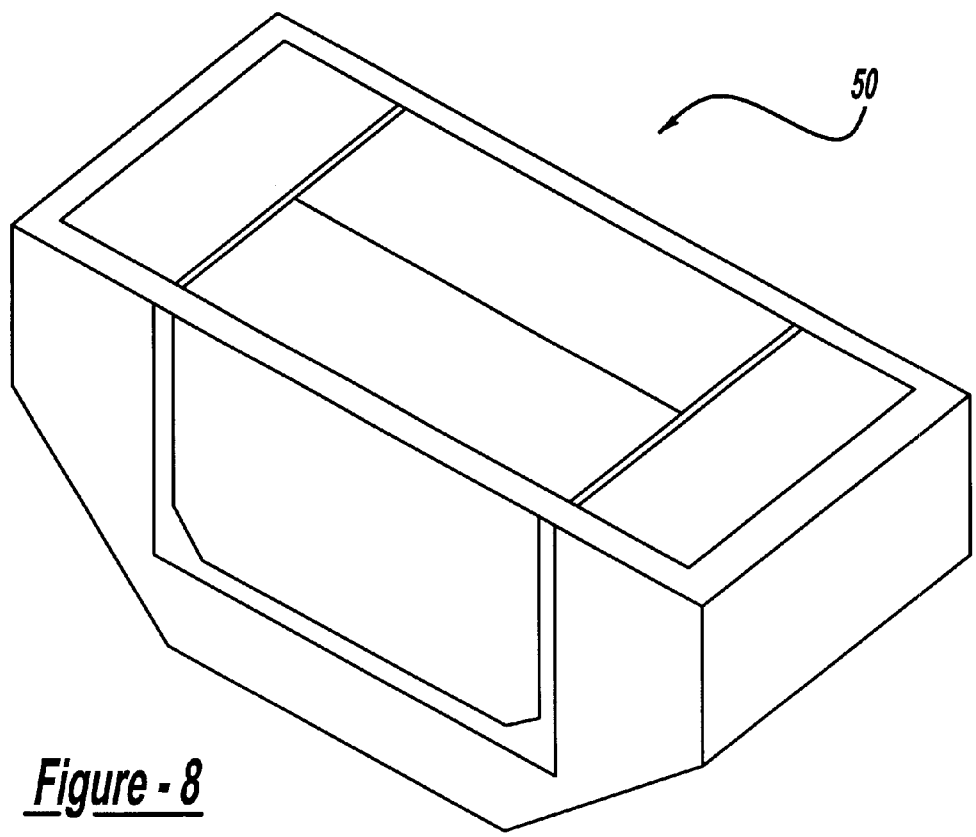
FIG. 8 is a perspective view of a cargo container according to the principles of the present invention.
Figure 12:
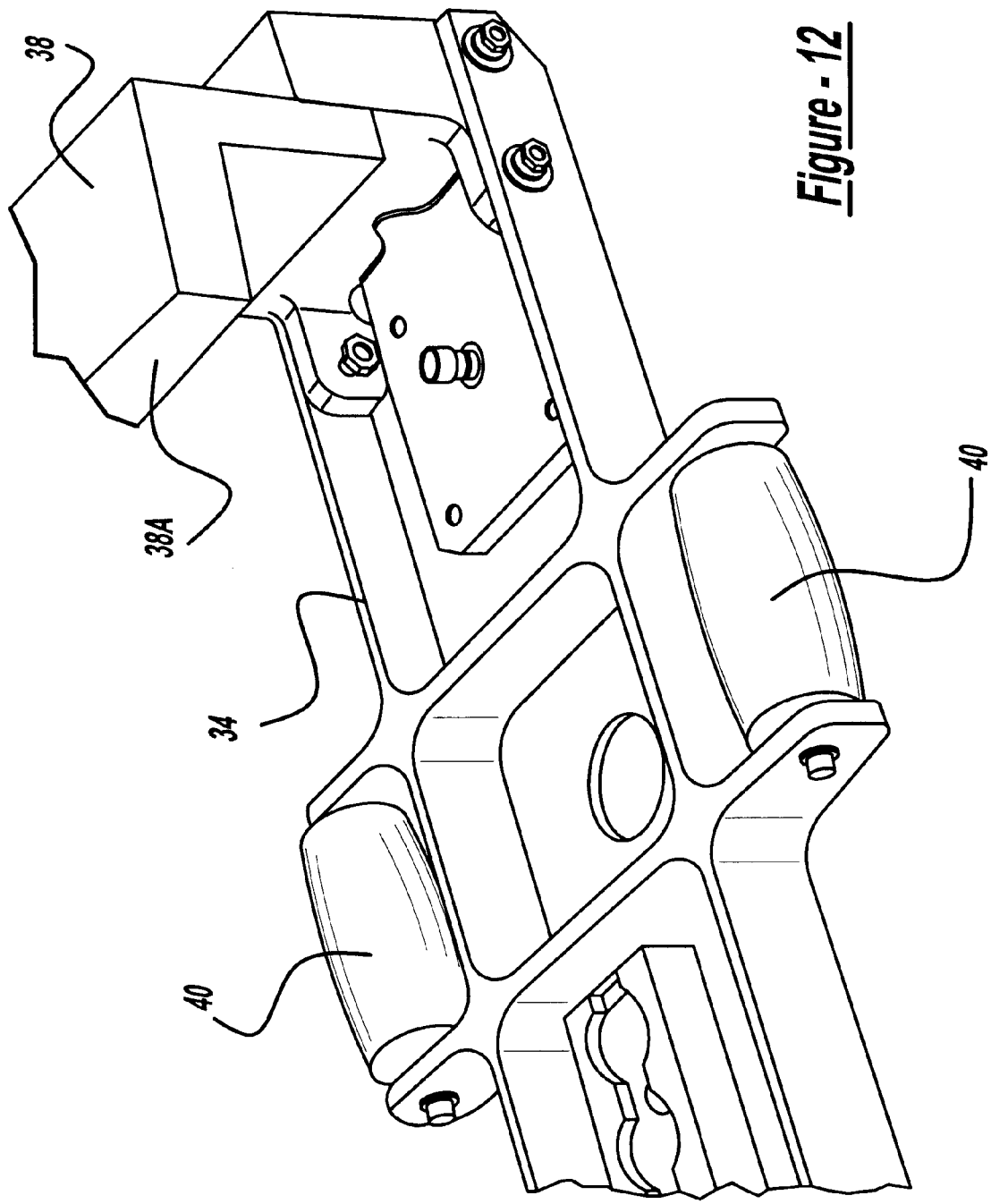
FIG. 12 is an enlarged view of a cross channel showing two rollers and a guide rail according to the principles of the present invention.
Figure 14:
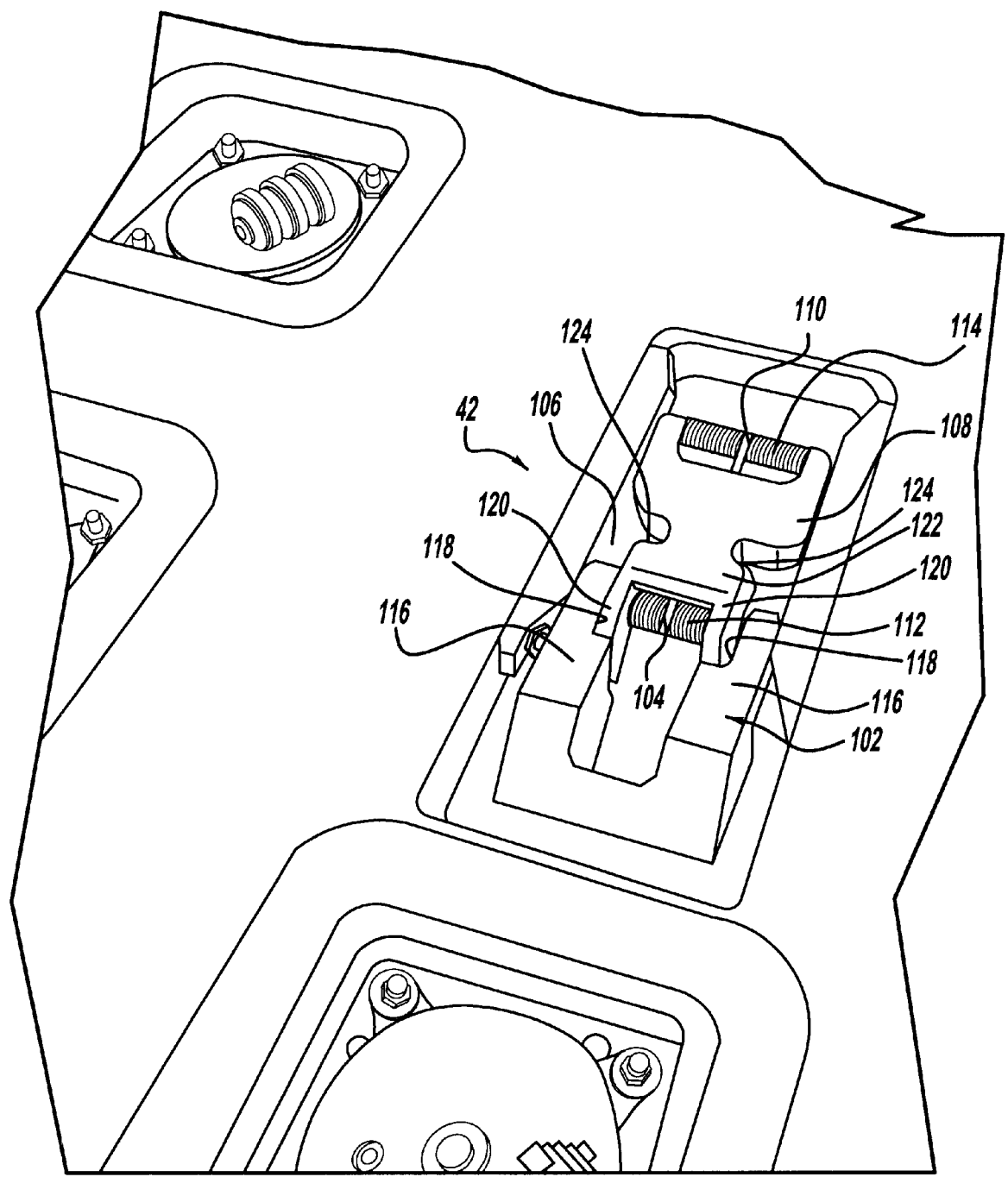
FIG. 14 is a perspective view of the cargo lock device shown in the retracted position.

With the general components of the cargo handling system 26 presented, a more detailed description of the CHS 26 and its method of operation now follows. With reference to FIGS. 1–2, aft cargo compartment 20 is representative of an aircraft cargo compartment that is loaded by moving the cargo containers 50 from an outboard area 52 through a cargo door opening 54 to an inboard area 56. When a cargo container 50 is placed into inboard area 56, it is placed onto the caster rollers 48 of the omni directional panel 36. While the cargo containers 50 are generally loaded onto the omni directional panel 36 in such a way as to reduce any repositioning, the caster rollers 48 are capable of rotating 360 degrees about an axis perpendicular to the cargo compartment floor 28, therefore the cargo container 50 can be aligned with the guide rails 38 of the CHS 26. The cargo container 50 of FIG. 8 is shown in FIGS. 9 and 10 with an associated guide rail 38 and rollers 40. Additionally, FIG. 12 shows an enlarged view of cross channel 34 showing guide rail 38, and rollers 40. As can be seen from FIGS. 9 and 10, cargo container 50 includes a recess 58 which receives an upper, inwardly projecting portion 38a of guide rail 38.

With the operative components of the CHS 26 initially presented, a typical loading scenario depicting the interaction and function of the CHS 26 components will now be explained. With reference to FIG. 2, when cargo containers 50 move from an aircraft outboard area 52 to an aircraft inboard area 56, they move in a lateral direction. Once inboard, the cargo container 50 is located upon the omni directional panel 36 and associated caster rollers 48. The portion of the container 50 is adjusted in order to orient the cargo container 50 with the guide rails 38 mounted opposite the cargo door 54.

Figure 7:
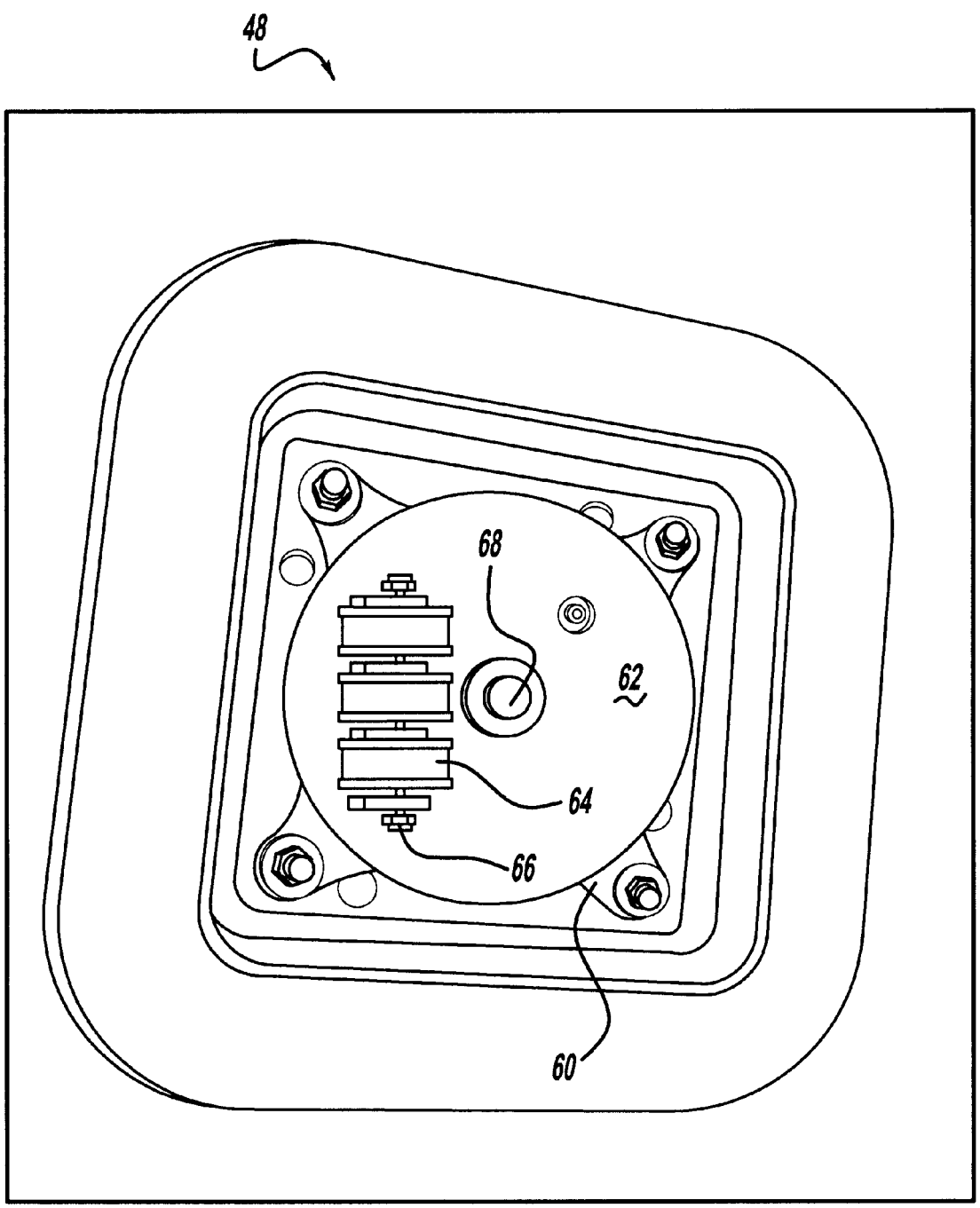
FIG. 7 is an enlarged view of a caster roller according to the principles of the present invention.
Figure 18:
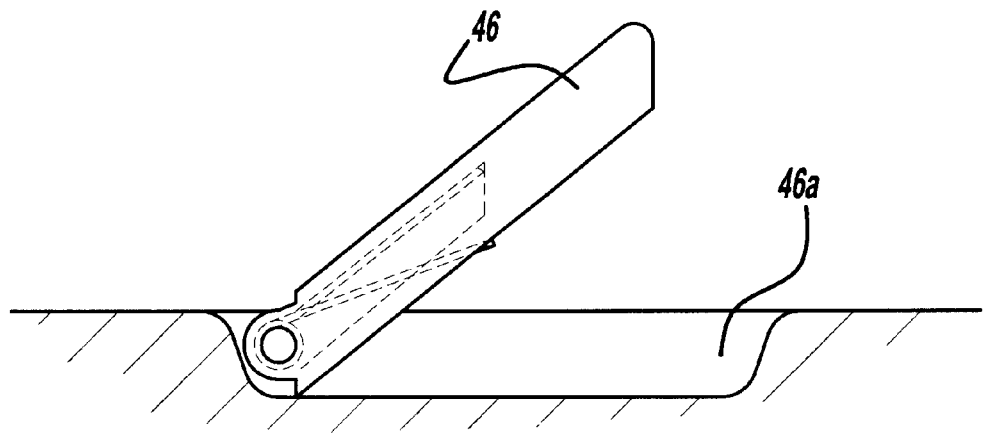
FIG. 18 is a side view of the anti-rollout restraint according to the principles of the present invention.

With reference to FIG. 7, caster roller 48 includes a base plate 60, rotational plate 62, and a plurality of bearings 64 that rotate upon a bearing shaft 66. The rotational plate 62 rotates about a plate shaft 68 to permit 360 degree rotation of the rotational plate 62 relative to the base plate 60. Additionally, once the cargo container 50 is inboard and aligned with the guide rail 38 opposite the cargo door opening 54, the anti-rollout restraint 46 (FIGS. 6 and 18) biases upward to prevent the cargo container 50 from rolling out of the aircraft 10. With reference to FIGS. 6 and 18, the anti-rollout restraint 46 is shown normally biased upward but easily biases downward into recessed cavity 46a to permit the unrestrained loading of the cargo container 50 into the aircraft 10. The spring 46b biases the anti-rollout restraint 46 to a normally upright position as illustrated in FIG. 18.

Figure 15:
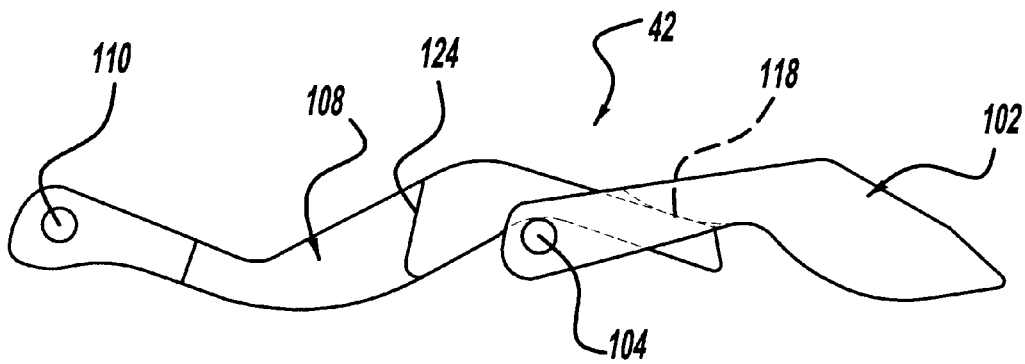
FIG. 15 is a side view of the cargo lock device of FIG. 14 shown in the retracted position.
Figure 16:
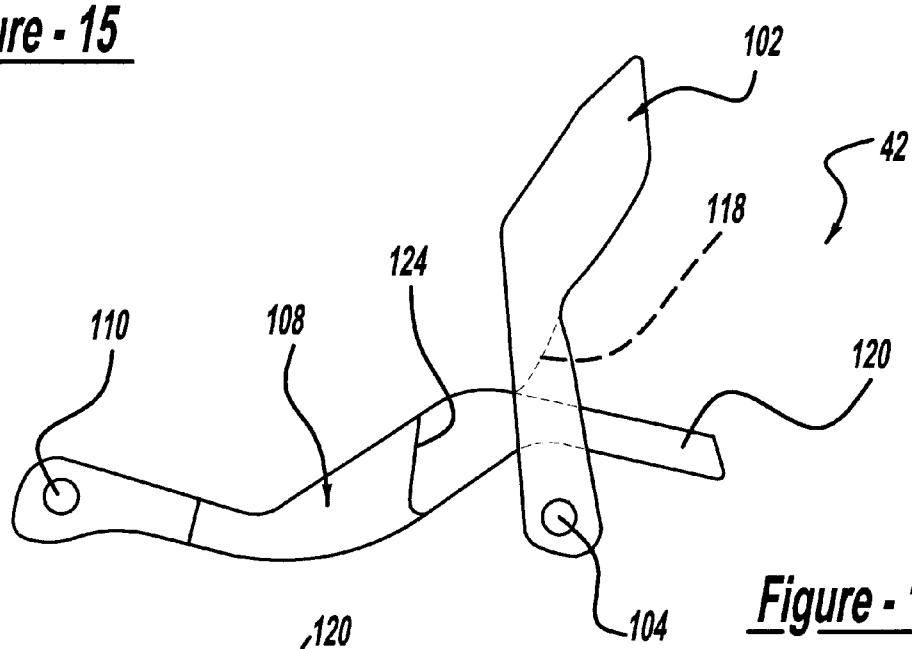
FIG. 16 is a side view of the cargo lock device in a partially extended position according to the principles of the present invention.
Figure 17:
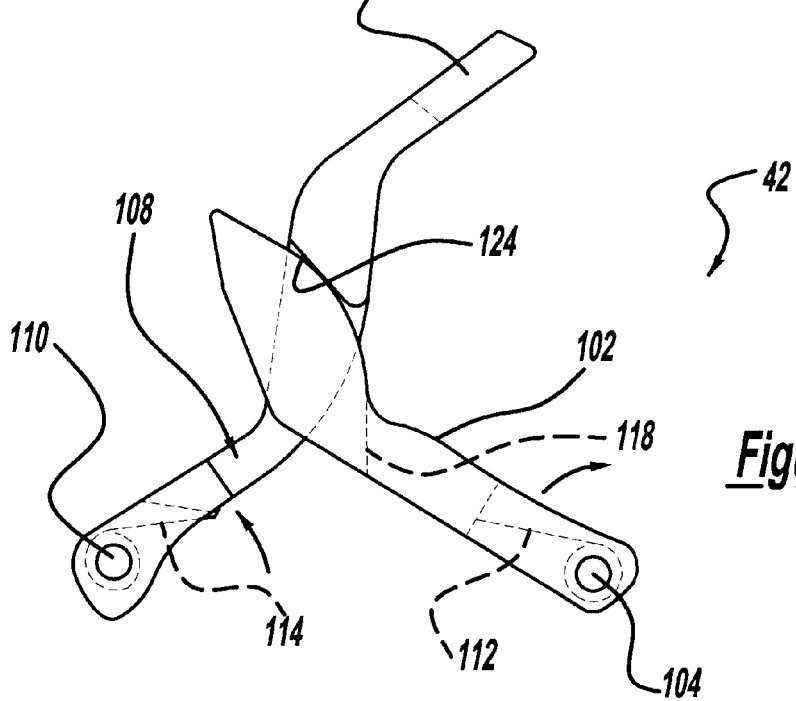
FIG. 17 is a side view of the cargo lock device in a fully extended position according to the principles of the present invention.

As shown in FIGS. 9 and 10, the cargo container 50 includes a recess 58 that accepts the inwardly projecting portion 38a of guide rail 38 of the CHS 26. With the cargo container 50 loaded and aligned with the guide rail 38 opposite the cargo door 54, the cargo container 50 is rolled deeper into and along the cargo compartment 20. Upon passing the cargo door opening 54, the cargo container 50 aligns with the guide rail 38 adjacent to the cargo door opening 54. Continuing, with reference to FIGS. 2 and 3, the cargo container 50 begins to translate on the rollers 40 in the structural channels 32 and the rollers 40 in the cross channels 34. The rollers 40 are crowned in the center as shown in FIG. 12 in order to reduce the area of contact against the cargo container 50 and ease in the rolling process. When the cargo compartment 20 is empty, the cargo container 50 moves to the end of the cargo compartment 20 and abuts against a cargo stop 70 (FIG. 3). When the cargo container 50 abuts cargo stop 70, a cargo lock 42 can be positioned against the cargo container 50 to secure the cargo container against the cargo stop 70. FIG. 5 shows a cargo lock 42 that pivots upwardly, as shown in FIGS. 15–17, to an engaged position to prevent movement of the cargo container 50. The cargo lock 42 includes a first arm 102 pivotally mounted about a pivot member 104 provided in the recess 106. A second arm 108 is pivotally connected to a second pivot member 110 provided in the recess 106. a first torsion spring 112 biases the first arm 102 to a normally horizontal position within the recess 106. A second torsion spring 114 biases the second arm 108 toward a vertical position. The first arm 102 is generally U-shaped with each leg 116 of the U-shaped arm 102 being pivotally mounted to the pivot member 104. Each leg 116 includes a recessed area 118 which are each engaged by a prong 120 of a fork-shaped end 122 of the second arm 108.

With reference to FIGS. 15–17, the operation of the cargo latch 42 will now be described. Initially, as shown in FIG. 15, the cargo latch 42 is in a stored horizontal position. The first arm 102 is then pivoted upward (in a counterclockwise direction as illustrated in the figures). As the first arm 102 is pivoted upward, the spring 114 biases the second arm 108 in an upward direction. Each prong 120 of the fork-shaped end 122 of the second arm 108 abuts against the recess 118 provided on each leg 116 of the U-shaped arm member 102. As the first arm 102 is pivoted backward far enough so that the recess portion 118 aligns with the shoulder portion 124 of the fork-shaped end 122, the second arm 108 is allowed to pivot upward to the position illustrated in FIG. 17. At this position, the spring 114 biases the second arm 108 in a counterclockwise direction while the spring 112 biases the first arm 102 in a clockwise direction, thus locking the first arm 102 and second arm 108 in the upright vertical positions illustrated in FIG. 17.

In order to retract the cargo latch 42, the second arm 108 is pushed downward in order to allow the recess portion 118 to overcome the shoulder portion 124 on the fork-shaped end 122 of the second arm 108 such that the spring then biases the first arm 102 toward the horizontal position as illustrated in FIG. 15. The cargo container 50 is able to roll over a cargo lock 42 when the cargo lock 42 is in a disengaged position. FIG. 5 shows a cargo lock 42 in the omni directional panel 36, while FIG. 3 and FIG. 11 show cargo locks 42a and 42b positioned along the structural channels 32 in order to secure each successive cargo container within the CHS 26.

Figure 13:
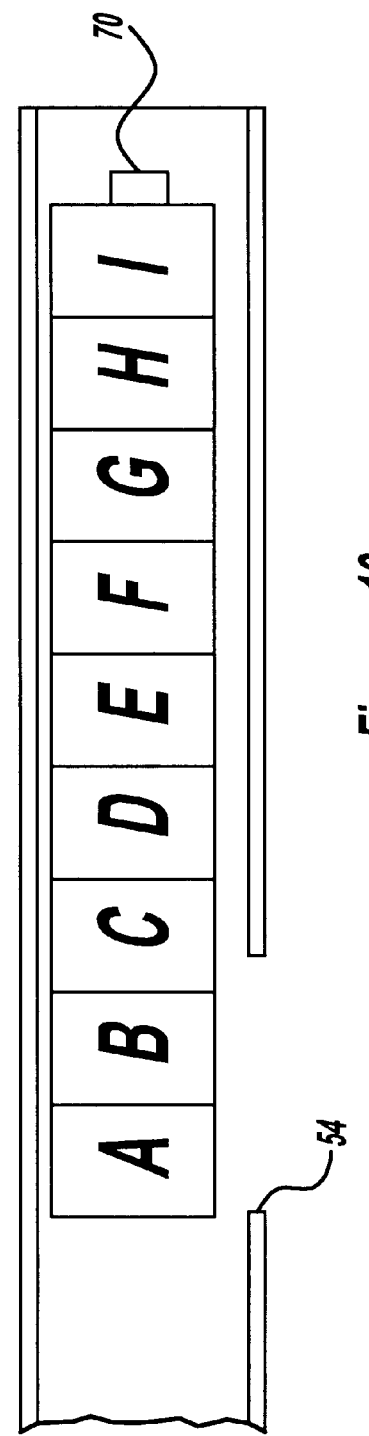
FIG. 13 is a plan view of a cargo compartment showing representative cargo containers in their stowed and secured positions.

With reference to FIGS. 9 and 10, as the cargo container 50 is rolled along the CHS 26, the guide rail 38 is secured within the cargo container 50 recess 58. This recess 58 and guide rail 38 combination secures the cargo container 50 in vertical and lateral directions during flight and also secures the cargo container 50 during loading and ensures uniform cargo container 50 alignment within the cargo compartment. After the first cargo container is loaded and secured with a cargo lock 42, a second, third, etc. cargo container may be loaded and secured with the cargo locks 42 until the cargo compartment is full. FIG. 13 illustrates a fully loaded compartment 72 with letters A–I representing successively loaded cargo containers.

When the last cargo containers B and A are loaded into the cargo compartment 20, cargo locks 42 in the omni directional panel 36 are employed. Recalling that cargo locks 42 in the structural channels 32 and omni directional panel 36 prevent movement of the cargo containers 50 in the forward and aft directions, while the guide rails 38 prevent movement in the vertical and lateral directions, the side latches 44 (FIG. 6) of the omni directional panel 36 are used to secure the cargo containers 50 in a vertical direction during flight. Therefore, the side latches 44 are also employed upon completely loading the cargo compartment 20.

Figure 19:
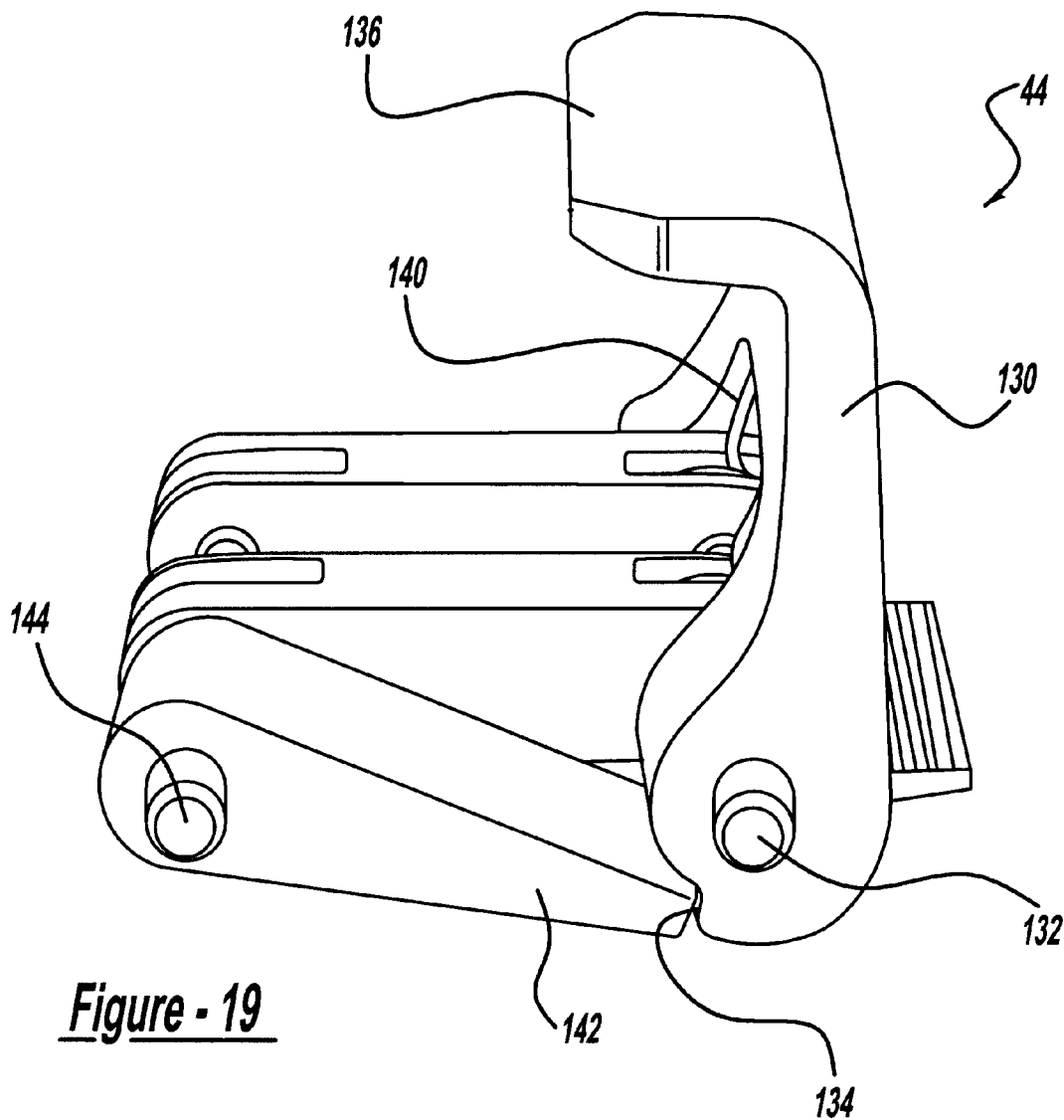
FIG. 19 is a perspective view of the side latch device shown in the latching position.
Figure 20:
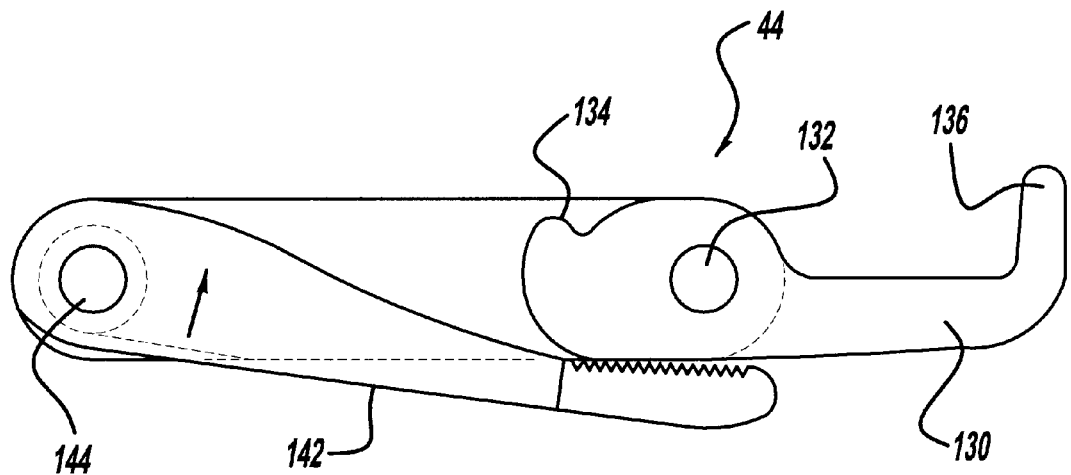
FIG. 20 is a side view of the side latch device of FIG. 19 shown in the retracted position.
Figure 21:
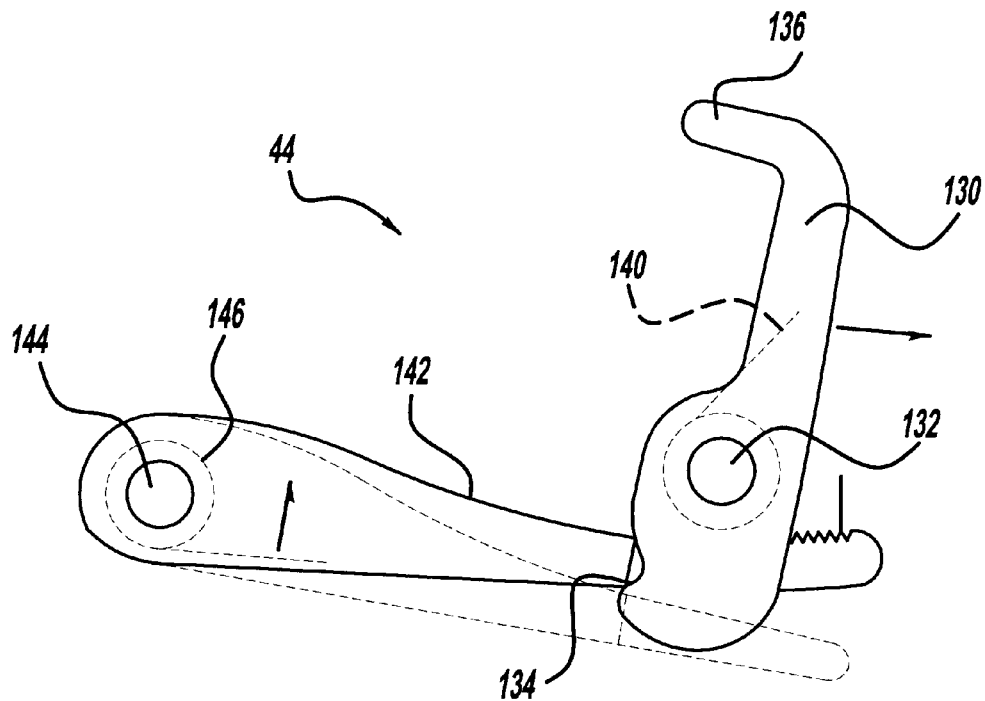
FIG. 21 is a side view of the side latch device shown in the latching position.

With reference to FIGS. 19–21, the side latch 44 includes a latch plate 130 pivotally mounted about a first pivot member 132. The latch plate 130 is mounted to the pivot member 132 at a first end thereof and includes a detent portion 134 at the first end. The latch plate 130 includes a second end 136 having a hook-shaped end portion which extends generally perpendicular to the latch plate 130. A spring 140 is provided for biasing the latch plate 130 toward a horizontal position as shown in FIG. 20. A locking lever 142 is pivotally mounted to a second pivot member 144. A second spring member 146 biases the locking member 142 to rotate in a counterclockwise direction as illustrated in the figures. The latch plate 130 can be pivoted from its horizontal position as shown in FIG. 20 to an upright vertical position (as shown in FIG. 21) against the biasing force of the spring 140. As the detent 134 becomes aligned with the locking lever 142, the locking lever 142 pivots upward by the biasing force of the spring 146 to a locking position in order to lock the latch plate 130 in the horizontal position. A release flange 150 is fixably attached to the locking lever 142 and can be pushed downward, as illustrated in phantom in FIG. 21, in order to disengage the locking lever 142 from the detent 134 such that the latch plate 130 is allowed to move to its horizontal position under the bias of spring 140. Thus, the side latch 44 can be operated between the stored position, as shown in FIG. 20, and the latching position, as shown in FIG. 21.

The above-described CHS is manual, however, optional power drive units (PDU) may be employed to eliminate the necessity of a person from having to board the aircraft 10 and move the cargo containers 50 along the CHS 26. With reference to FIG. 4, an optional PDU 74 and associated power roller 76 is available for mounting within representative power cavity 78 of the cargo compartment floor 28. FIG. 3 shows additional power cavities 78 along the CHS 26 between the structural channels 32. With reference to FIG. 13, PDUs are employed to apply a force against the cargo containers to secure them against the cargo stop 70 (in the case of cargo container I), or an adjacent cargo container C–H. Cargo containers A and B are moved manually due to their location relative to the cargo door 54.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cargo handling system for a storage compartment of an aircraft comprising:
   a plurality of structural channels adapted to be disposed upon a floor of the aircraft storage compartment;
   a plurality of cross channels adapted to be transversely disposed on the storage compartment floor of the aircraft, wherein said cross channels are connected to said structural channels;
   a plurality of rollers located within said structural channels, wherein a portion of said roller is disposed above said structural channel;
   a cargo container for holding cargo while it is in the storage compartment, said cargo container designed to roll upon said rollers;
   a plurality of guide rails attached transversely to said cross channels and situated parallel to said roller channels; and
   a plurality of cargo locks located within said structural channels, wherein said cargo locks restrain the cargo containers in a direction parallel to said fuselage.

2. The cargo handling system of claim 1 further comprising an omni directional panel for orienting said cargo container upon placing the cargo container into the storage compartment, wherein said omni directional panel permits orienting the cargo container 360 degrees about an axis perpendicular to said omni directional panel.

3. The cargo handling system of claim 2 further comprising a side latch located within said omni directional panel, proximal to a cargo door, wherein said side latch restrains said cargo container in a lateral direction and in a vertical direction during aircraft flight.

4. The cargo handling system of claim 2 further comprising a biased anti-rollout restraint located within said omni directional panel to restrain said cargo containers in a lateral direction.

5. The cargo handling system of claim 4 wherein said anti-rollout restraint is biased in a lateral direction and pivots about an axis parallel to the aircraft fuselage.

6. The cargo handling system of claim 2 wherein said omni directional panel includes a plurality of caster rollers, said caster rollers permitting rotation 360 degrees about an axis perpendicular to said omni directional panel.

7. The cargo handling system of claim 1 wherein said guide rails insert into a recession of said cargo container to prevent vertical movement of said cargo containers.

8. The cargo handling system of claim 1 wherein said rollers have a crowned exterior surface.

9. The cargo handling system of claim 1 further comprising a power drive unit wherein said power drive unit mounts between said structural channels and is used to position the cargo containers within the storage compartment.

10. The structural channels of claim 1 wherein said structural channels are in the shape of a C section with an upwardly facing channel.

11. An aircraft cargo handling system for moving cargo containers within an aircraft cargo compartment comprising:
    a plurality of roller channels, wherein said roller channels include a structural C channel adapted to be disposed on a floor of the aircraft fuselage with an upwardly facing channel;
    a plurality of rollers located within each of said upwardly facing channels, wherein a portion of said roller is disposed above said roller channel;
    a plurality of cross tracks attached at right angles to said roller channels, wherein said cross tracks contain rollers;
    a plurality of guide rails attached transversely to said cross tracks and situated parallel to said roller channels;
    a plurality of cargo locks located within said roller channels, wherein said cargo locks restrain the cargo containers in a direction parallel to said fuselage; and
    a side latch wherein said side latch restrains the cargo container in a vertical and lateral directions.

12. The cargo handling system of claim 11 further comprising an anti-rollout restraint located within an omni directional panel, adjacent to a cargo door, to restrain the cargo container in a lateral direction.

13. The cargo handling system of claim 11 further comprising an omni directional panel for orienting the cargo container upon placing the cargo container into the storage compartment, wherein said omni directional panel permits rotation of the cargo container 360 degrees about an axis perpendicular to said omni directional panel.

14. The omni directional panel of claim 13 further comprising a plurality of caster rollers, said caster roller rotating 360 degrees about an axis perpendicular to said omni directional panel.

15. The cargo handling system of claim 11 wherein said anti-rollout restraint is biased in a lateral direction.

16. The cargo handling system of claim 11 wherein said guide rails insert into a recession of the cargo containers to prevent vertical and lateral movement of the cargo containers while the cargo containers are on said rollers.

17. The cargo handling system of claim 11 further comprising at least one power drive unit between said roller channels to move the cargo containers on said rollers.

18. The rollers of claim 11 wherein said rollers have a crowned exterior surface.

19. The guide rails of claim 11 wherein said guide rails protrude into a recession of the cargo containers to restrain the cargo containers in a lateral direction and in a vertical direction.

20. The cross tracks of claim 11 where in said cross tracks contain rollers for supplementing the support and movement of the cargo containers.

* * * * *